J. H. TIMS.
Car-Axle Box.
No. 1,390. Patented Oct. 31, 1839.
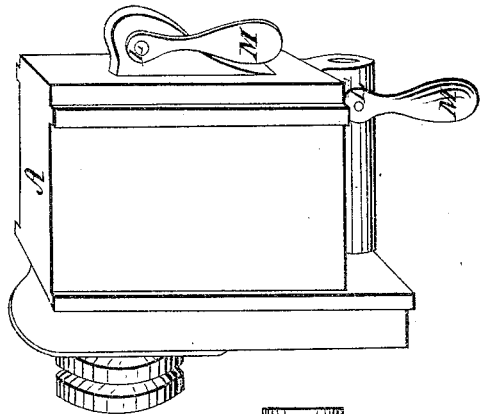
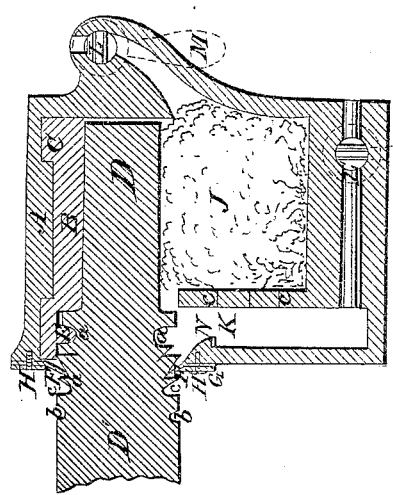
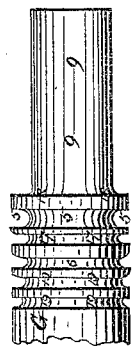
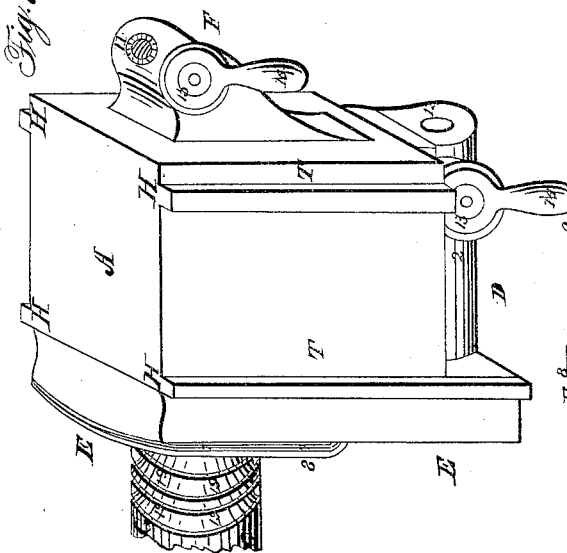
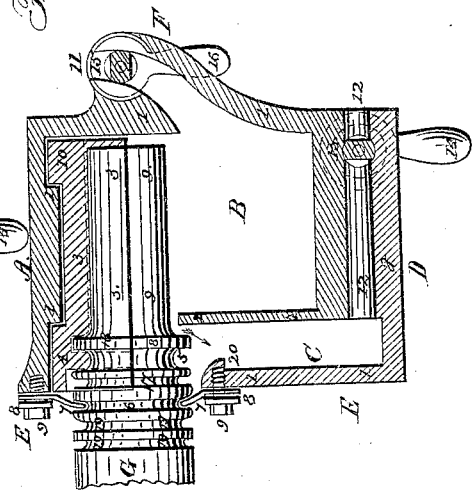
Witnesses:
Inventor:
John H. Tims

UNITED STATES PATENT OFFICE.

JOHN H. TIMS, OF NEWARK, NEW JERSEY.

MODE OF CONSTRUCTING THE BEARINGS AND OIL-BOXES FOR THE JOURNALS OF RAILROAD-CARS, LOCOMOTIVES, AND OTHER VEHICLES OR MACHINES.

Specification forming part of Letters Patent No. 1,390, dated October 31, 1839; Reissued June 13, 1844, No. 63.

*To all whom it may concern:*

Be it known that I, JOHN H. TIMS, of the city of Newark, in the county of Essex and State of New Jersey, have invented a new and improved mode of constructing the bearings and oil-boxes for the journals of railroad-cars, locomotives, and other vehicles or machines which have their bearings in brasses or boxes on the upper sides of their journals; and I do hereby declare that the following is a full and exact description thereof.

Those persons who are familiar with the construction and operation of the bearings, and the oil, or grease boxes, now in use for the purpose of lubricating such axles, are aware that they are, in general, imperfect in their action, frequently wasteful of oil, and liable to many serious objections. They have in general been so constructed as to apply the oil, or other lubricating material, through apertures which are intended to conduct it on to the upper side of the journal, which apertures are liable to be choked, and indeed almost uniformly become so, shortly after having been put into order.

By my improvement the oil is applied onto the lower side of the journal, and there are not any apertures, or conduits, through which the oil is to flow, that are liable to be accidentally stopped up, or obstructed.

In the accompanying drawings Figure 1, represents a perspective view of the exterior of the apparatus, and Fig. 2, a vertical section through the box, bearing, and journal, in the direction of the length of the latter.

A, is the top, or upper side, of the box, which bears against the spring, or brace, in the ordinary way.

B, is the brass, or bearing, for the journal, extending from end to end of the box. To check this bearing, and prevent its tendency to work endwise, I form a recess in the upper part of the box, into which a projection on the bearing enters, as seen at C.

A section of the journal is shown at D, D', representing it, and the box, as when formed for outside bearings; D', being the commencement of the hub.

When constructed for cars, and which have their bearings inside of the wheels, the respective parts must necessarily undergo such modifications as are requisite to adapt the box and its appendages thereto; these modifications will be obvious to every competent engineer, and do not, therefore, require to be described.

E, represents a fillet, or tongue, formed upon the bearing, which fillet enters into a corresponding groove d, d, in the journal, which will aid in sustaining the lateral pressure, and in preventing wear from this cause, coöperating with the ordinary collars upon the end of the axles, in effecting this object.

The opening in front of the box through which the journal passes, I cover by means of a leather cap, or washer, which is secured around the opening by a metal ring, held in its place by screws. The inner edge of this leather cap, or washer, is received into a groove turned in the journal for that purpose, thus retaining the oil within the box, and preventing the entrance of dust and dirt from without.

F, F, shows the leather cap, or washer; G, G, the metal ring holding it on to the box, by means of the screws H, H. The inner edge of the leather is received in the groove a, a. A groove b, b, is turned next the hub, to turn off the water and dirt from the box, toward the hub.

c, c, is a groove which forms a coned bead, the edge of which causes the oil upon the journal to drip into the box below it.

d, d, is the groove which forms the collar of the journal, and receives the tongue E.

Below the journal the box is made hollow, and close, to constitute the oil chamber, and this hollow space is divided into two compartments I, and K, for containing the oil, the division between the two being made by the partition e, e, extending up from the bottom of the box, but terminating above as shown in the drawing, in such manner as that the oil contained in one compartment may flow over into the other. A sponge, or other absorbent elastic material, sponge being preferred, is pressed into the compartment I, but not into the compartment K. The sponge fills the compartment I, and bears against the lower side of the journal D, which is to be kept lubricated by the oil contained in the sponge. Spiral or other springs may be placed below the sponge, to press it upward.

L, and L', are two cocks, through one of which L, oil may be admitted into the compartment I, and through the other L′, oil may flow from the compartment K. The handles of these cocks, M, M, by their gravity, keep the cocks closed, excepting when it is desired to open them.

N, is a projection inward so formed as that the oil which may be contained in the compartment K, shall, when agitated by the motion of the car, not splash over toward the hub, but be thrown back again into the compartment.

When oil is to be supplied for oiling the journals the cock L, is to be opened, and the oil forced through it. It will then pass into the compartment I, and be absorbed by the sponge. When this has taken place, it will flow over the top of the partition e, e, and fill the compartment K. The presence of the oil in this compartment is ascertained by opening the cock L′ which will allow a portion of such oil to flow out. The quantity of oil thus absorbed by the sponge together with that contained in the compartment K, will serve to lubricate the axle for a great length of time.

The oil has no tendency to waste when the car is at rest. When in motion, the agitation will cause a portion of the oil in K, to pass over into I, thus compensating for its gradual waste, while it will not tend to escape in the reverse direction. Should it be preferred, holes may be drilled through the partition e, e, near its bottom so as to allow any oil which may be in K, to flow through into I, and to be taken up by capillary attraction.

The difference in the characteristic features of my oil box, and bearings for journals, and those which have been heretofore employed, will be manifest to every competent machinist. It will also be evident that the form of the respective parts will admit of considerable variation, while the general operation, and principle of action may remain unchanged. I do not therefore, by the foregoing specification, intend to limit myself to the precise form and arrangement which I have described and exhibited; but I design to vary them as I may think proper, while the same ends are attained by analogous means.

What I claim as constituting my invention, is—

1. The general construction of the oil box, and bearing for journals, as above described; that is to say, I claim the mode of using a sponge, or other analogous substance, in a box, or compartment, below the journal, for lubricating the same in the manner set forth, said oil box being constructed with a second compartment, for containing such oil as may flow over from that in which the sponge is deposited, and for affording a fresh supply to the sponge, as it becomes exhausted. I do not claim the simply supplying the oil below the journal, but only in combination with said box.

2. I claim the arrangement for supplying the oil, and of allowing a portion of it to flow off, by means of cocks, arranged and combined as herein described.

3. I claim the particular manner in which I have constructed the journal and its bearings, in combination with the foregoing lubricating apparatus, consisting in the fillet or tongue; the recess for checking the lateral motion of the bearing, the respective grooves, and the cap or washer of leather for retaining the oil, in combination, as set forth.

JOHN H. TIMS.

Witnesses:
 SAMUEL PIERCE,
 SANDFORD M. TOWER.

[FIRST PRINTED 1914.]